C. E. HELMICK & W. E. ADLER.
HAY STACKER.
APPLICATION FILED DEC. 30, 1910.
1,015,440.
Patented Jan. 23, 1912.
3 SHEETS—SHEET 3.
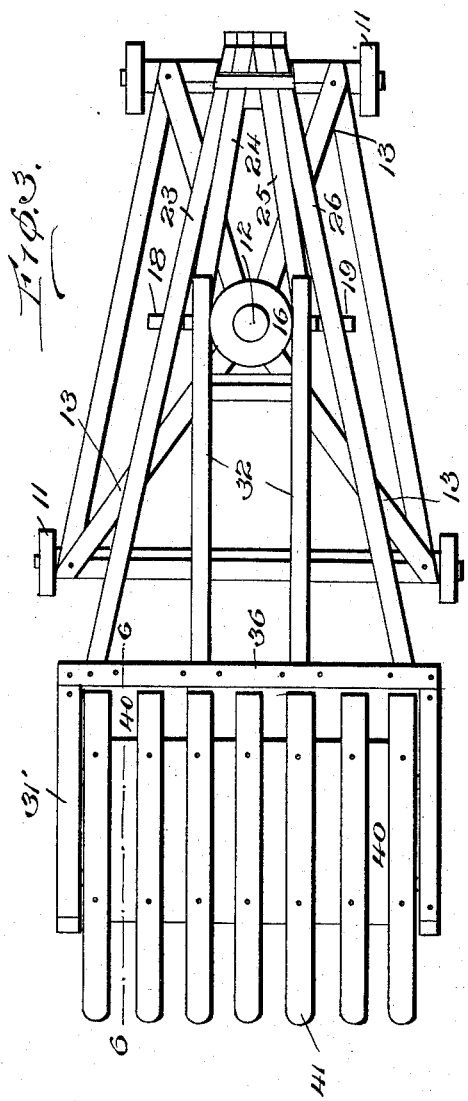
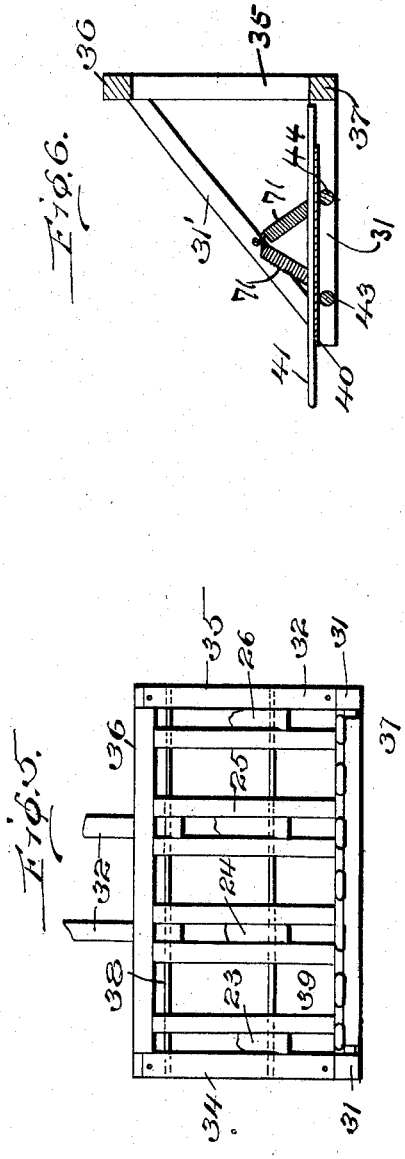

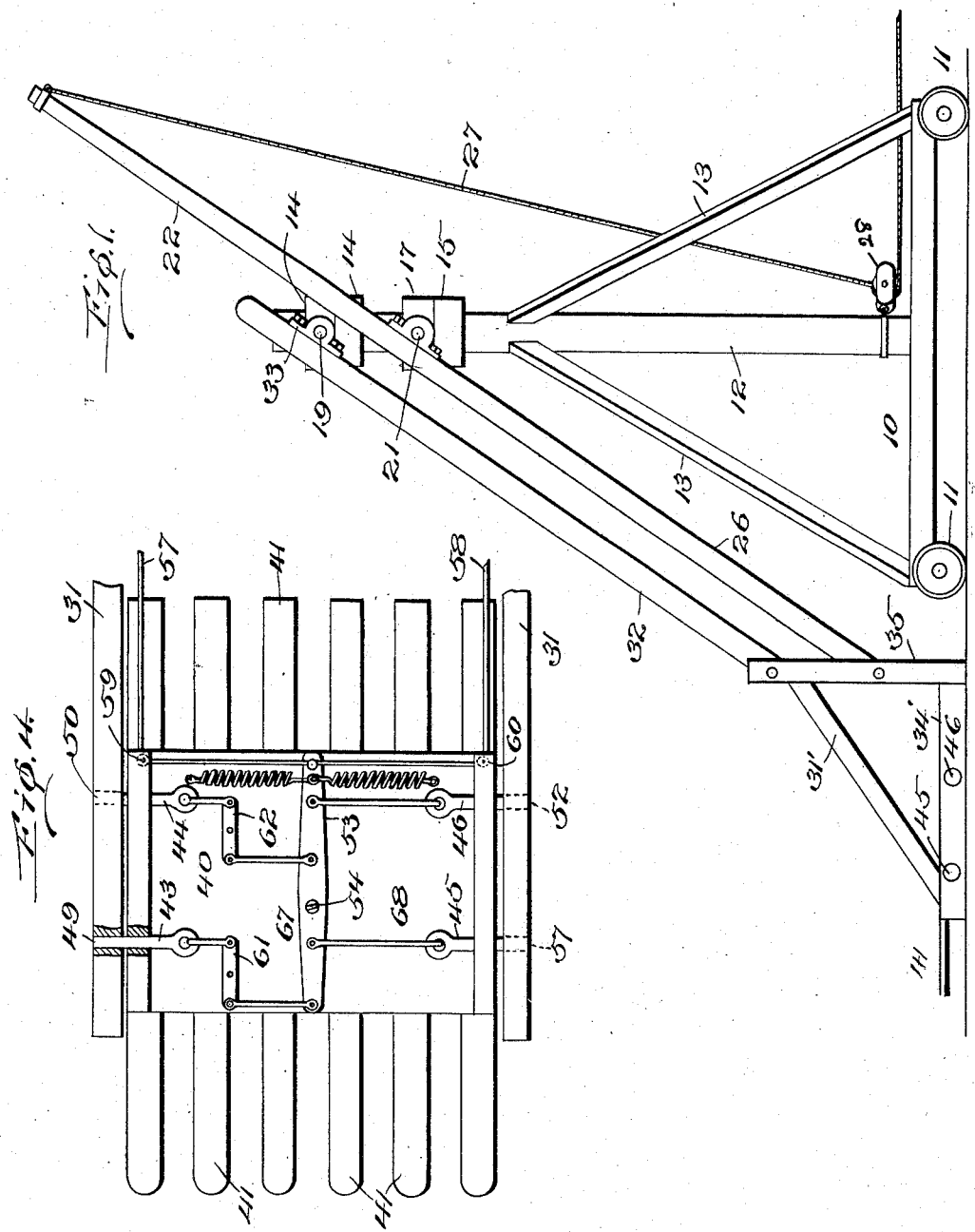

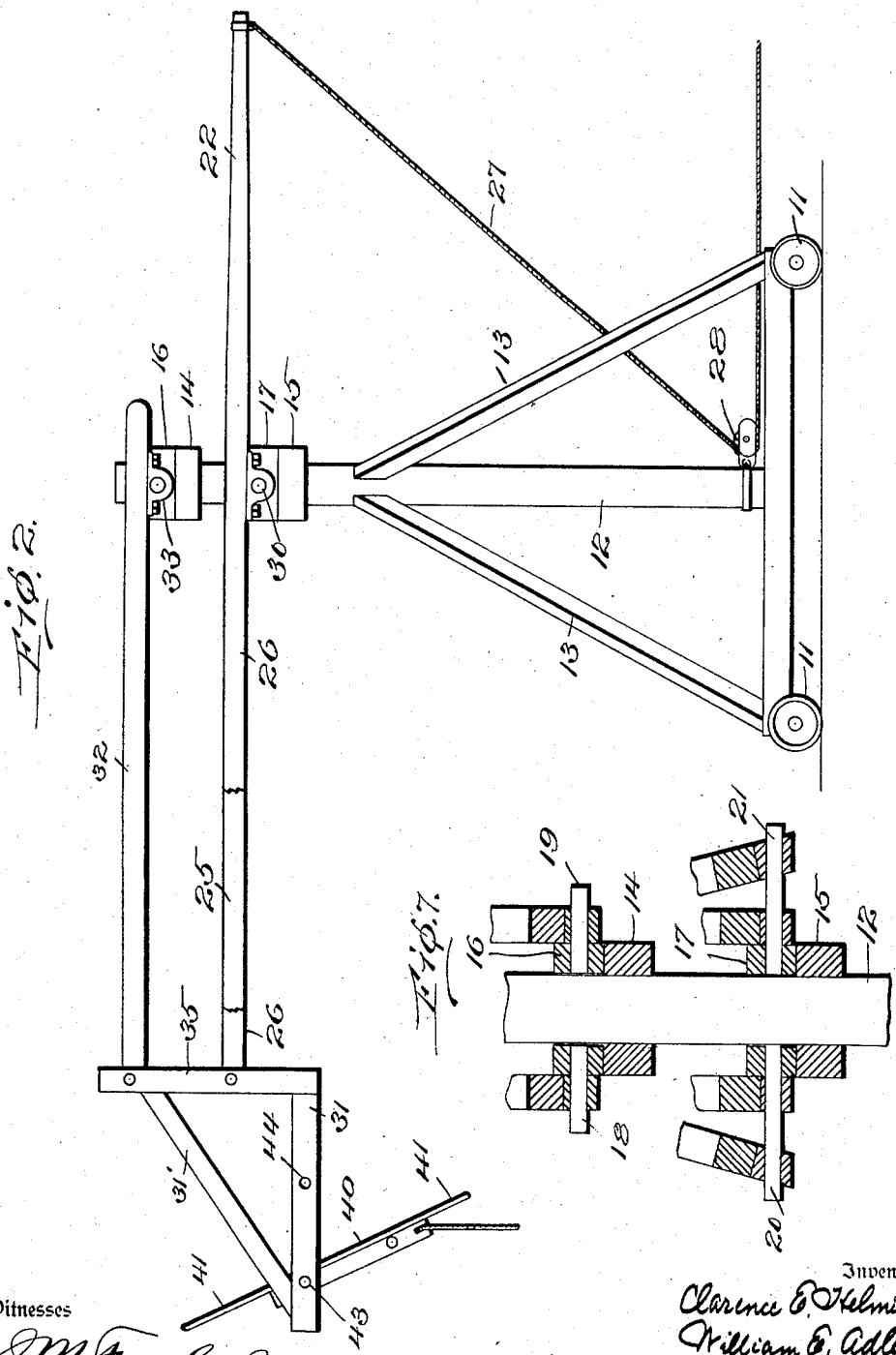

UNITED STATES PATENT OFFICE.

CLARENCE E. HELMICK AND WILLIAM E. ADLER, OF LA GRANDE, OREGON.

HAY-STACKER.

1,015,440.　　　　　Specification of Letters Patent.　　Patented Jan. 23, 1912.

Application filed December 30, 1910. Serial No. 600,141.

*To all whom it may concern:*

Be it known that we, CLARENCE E. HELMICK and WILLIAM E. ADLER, citizens of the United States, residing at La Grande, in the county of Union and State of Oregon, have invented certain new and useful Improvements in Hay-Stackers; and we do hereby declare the following to be a full, clear, and exact description of the invention, such as will enable others skilled in the art to which it appertains to make and use the same.

This invention relates to hay stackers, and the object is to provide improved means for elevating the hay and discharging it from either side of the cradle, regardless of the exact position of the hay on the cradle.

A further object is to provide a plurality of devices for releasing the cradle, either of which may be used, depending upon the side upon which it is desired to dump the contents, and a still further object is to provide means whereby only one of the releasing devices may be operated at one time.

With these objects in view, the invention consists in the novel construction hereinafter described and claimed.

In the accompanying drawings forming a part of this application, Figure 1 is a view of the device in side elevation. Fig. 2 is a similar view with the cradle in its elevated position. Fig. 3 is a top plan view. Fig. 4 is a bottom plan view of the cradle, showing the operating means. Fig. 5 is a rear elevation of the cradle. Fig. 6 is a view of the latter, partly in section. Fig. 7 is a detail showing the manner of connecting the parallel arms with the means for supporting the same.

In carrying out our invention, we provide a base portion 10 mounted on wheels 11, having a mast 12 extending upwardly from the base and braced by means of members 13 connected with the base at the corners thereof. The mast carries two fixed collars or supporting devices 14 and 15, arranged to support rotatable collars 16 and 17, with which the devices carrying the cradle are connected by means of pins 18, 19, 20 and 21. A derrick arm 22 comprises a plurality of members 23, 24, 25 and 26 connected at their forward ends with the cradle and at the rear end of arm 22 a flexible device 27 is secured, such device extending thence around pulley 28 near the base of the mast and movable around the latter. On the under side of the derrick arm, bearing members 29 and 30 are secured and accommodate pins 20 and 21 secured to collar 17. The cradle has also connected thereto a plurality of arms 32 carrying bearing members 33 whereby the said arms are connected with collars 16, through the medium of pins 18 and 19.

The construction above described permits the raising of the cradle and the swinging thereof to any desired position.

Referring more particularly to the cradle which is an important feature of the invention, it may be stated that the latter consists of lower side members 31, uprights 34 and 35 connected by cross pieces 36 and 37 and tie rods 38 and 39. The dumping portion includes a substantially flat portion 40 having blades or prongs 41 projecting from both sides thereof. In order that the contents may be dumped in either direction regardless of the position of the cock with reference to the transverse axis of the cradle, we provide means for performing the dumping operation from both sides, and arrange for locking a portion of the mechanism so that if both ropes connected with the operating lever are pulled at one time, by accident, no harm will result. Locking bolts 43, 44, 45 and 46 are arranged to reciprocate in apertures in side members 27 and 48 of member 40 and to enter holes 49, 50, 51 and 52 in the adjoining portions of the frame. A main lever 53 is pivoted at 54, and is held normally in the position shown in Fig. 4 by means of springs 55 and 56, the lever being operated by means of ropes 57 and 58 passing around pulleys 59 and 60. Two short levers 61 and 62 are pivoted on one side of lever 53 and are connected with the main lever by rods 63 and 64 secured on opposite sides of the pivotal point 54, the short levers being also connected by rods 65 and 66 with locking bolts 43 and 44. The arm of the main lever which has connection as above with bolt 49 is also connected at 67 by rod 68 with bolt 45 which is in alinement with bolt 43, and the other arm of lever 53 has connection at 69 with bolt 46, by means of rod 70. Bolt 46 is in alinement with bolt 44. It will be observed that the pulling of either cord will cause one set of bolts, oppositely located to be withdrawn from their locked position, thus releasing that side of the dumping member, while the bolts of the other set are carried slightly farther into their locked position.

In order to provide for the return of the dumping member to its locked position, after being carried out of that position by the weight of the hay, the said member is connected with the framework at its upper portion by means of resilient devices 71 arranged as shown in Fig. 6, a retaining member 73 being disposed in line with the transverse axis of the dumping member.

We do not desire to limit ourselves to the exact construction shown and described, but may make such changes as fall within the scope of the appended claims, without departing from the spirit of the invention.

What we claim is:

1. In a hay stacker, a derrick arm and means for supporting the latter, a cradle carried by the arm, said cradle comprising a dumping member, a frame, resilient means for supporting said member in a given position with reference to the frame, pivotal means for connecting said member with the frame on both sides of the transverse axis of the member, means for throwing the pivoted devices out of their operative position, on one side of said axis, and a resilient device for returning them to their normal position.

2. In a hay stacker, a derrick arm and means for supporting the latter, a cradle frame carried by the arm, a dumping member within the frame, a lever carried by said member, a plurality of locking bolts connected with one arm of the lever, said bolts being in alinement and located on one side of the transverse axis of the dumping member, and a plurality of bolts connected with the other arm of said lever and disposed on the opposite side of said axis, the bolts last mentioned being released simultaneously.

3. In a hay stacker, a derrick arm and means for supporting the latter, a cradle frame carried by the arm, a dumping member with the frame, a main lever carried by said member, a second lever opposite one arm of the main lever, a plurality of bolts connected with said arm, one of said bolts being directly connected and the other being connected through the medium of the second lever, and a plurality of bolts similarly connected with the other arm of the main lever, on the side of the transverse axis of the dumping member opposite to that on which the first set of bolts is located, the bolts connected with a given arm of the main lever being released simultaneously.

In testimony whereof we affix our signatures in presence of two witnesses.

CLARENCE E. HELMICK.
WM. E. ADLER.

Witnesses:
C. J. VANDERPOEL,
H. E. COOLIDGE.

---

Copies of this patent may be obtained for five cents each, by addressing the "Commissioner of Patents, Washington, D. C."